United States Patent
Kamath et al.

(10) Patent No.: US 8,842,780 B2
(45) Date of Patent: Sep. 23, 2014

(54) METHOD AND APPARATUS FOR CORRECTING SIGNAL DEPENDENT DUTY CYCLE ERRORS IN AMPLITUDE SHIFT KEYING RECEIVERS

(75) Inventors: Anant S. Kamath, Bangalore (IN); Sriram Ramadoss, Bangalore (IN); Shrinivasan Jaganathan, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 376 days.

(21) Appl. No.: 13/328,908

(22) Filed: Dec. 16, 2011

(65) Prior Publication Data

US 2013/0156131 A1   Jun. 20, 2013

(51) Int. Cl.
 *H04L 27/02* (2006.01)
 *H04L 27/06* (2006.01)
(52) U.S. Cl.
 USPC ............................ 375/320; 375/317; 375/346
(58) Field of Classification Search
 CPC ................................ H04L 27/02; H04L 27/06
 USPC .......................................... 375/316, 317, 320
 See application file for complete search history.

(56) References Cited

U.S. PATENT DOCUMENTS

| | | | |
|---|---|---|---|
| 4,635,142 A * | 1/1987 | Haugland | 360/46 |
| 4,947,407 A | 8/1990 | Silvian | |
| 5,319,191 A | 6/1994 | Crimmins | |
| 5,933,040 A * | 8/1999 | Rokhsaz et al. | 327/306 |
| 6,496,549 B1 * | 12/2002 | Crawford | 375/320 |
| 7,885,359 B2 | 2/2011 | Meltzer | |
| 2008/0252367 A1 | 10/2008 | Pettersen et al. | |
| 2009/0177954 A1 * | 7/2009 | Takahashi et al. | 714/819 |

* cited by examiner

*Primary Examiner* — Shuwang Liu
*Assistant Examiner* — David S Huang
(74) *Attorney, Agent, or Firm* — Alan A. R. Cooper; Frederick J. Telecky, Jr.

(57) ABSTRACT

An apparatus for demodulating an Amplitude Shift Keying (ASK) encoded signal is provided. The apparatus comprises a peak detector, a first comparator, a threshold generator, a delay circuit, and a second comparator. The peak detector is configured to detect a peak voltage, and the first comparator is coupled to the peak detector and receives a first threshold voltage. The threshold generator is coupled to the peak detector and is configured to generate a second threshold voltage that is proportional to peak voltage. The delay circuit is coupled to the first comparator, and the second comparator is coupled to the delay circuit and that is coupled to the threshold generator so as to receive the second threshold voltage.

17 Claims, 6 Drawing Sheets

US 8,842,780 B2

METHOD AND APPARATUS FOR CORRECTING SIGNAL DEPENDENT DUTY CYCLE ERRORS IN AMPLITUDE SHIFT KEYING RECEIVERS

TECHNICAL FIELD

The invention relates generally to a receiver and, more particularly, to an Amplitude Shift Keying (ASK) receiver.

BACKGROUND

ASK encoding schemes are employed in a variety of applications. An example of a system 100 employing ASK encoding can be seen in FIG. 1. In this system 100, a transmitter 102 is able to encode a signal from signal source 101 and transmit the encoded over channel 104. The receiver 106 is then able to generate signal OUT from the encoded signal. This is normally accomplished by filtering the signal (with filter 108), demodulating (with demodulator 110), and converting the signal into a digital representation (with analog-to-digital converter (ADC) 112).

With ASK encoding, there are a variety of different schemes that can be employed, the simplest being on-off keying, and the demodulator 110 can vary in configuration based on the AKS encoding scheme used. An example of a demodulator 110 can be seen in FIG. 2. Here, a peak detector or rectifier 202 is used to convert the signal from the filter 108 into a peak detect signal PEAKDET. Typically, when there is a sine wave at the base of transistor Q1 (which corresponds to a '1'), capacitor C1 will be charged to the peak value (or peak voltage) of the peak detect signal PEAKDET minus one base-emitter voltage drop (from transistor Q1). Alternatively, when the sine wave is missing at the base of transistor Q1, the current source 206 discharges the capacitor C1 and drives the peak detect voltage to zero. Based on this peak detect signal PEAKDET, the comparator 204 can generate a comparison result for ADC 112 using a threshold or reference voltage REF.

However, since the sine wave input for a logic high or '1' bit can be allowed to have a range of amplitude levels so as to allow for varied transmission output swings and characteristics of channel 104, demodulation can become difficult. As a result of having this range of amplitude levels, the peak voltage (and, thus, the voltage held by capacitor C1) can vary, being input signal dependent. Additionally, because of this variation in the voltage held by capacitor C1, the time to reach the reference voltage REF varies, making the duty cycle input signal dependent as shown in FIG. 3. Thus, there is a need for a method and/or apparatus to improve the duty cycle performance of the demodulator 110.

Some other examples of conventional circuits are: U.S. Pat. No. 4,947,407; U.S. Pat. No. 5,319,191; U.S. Pat. No. 7,885,359; and U.S. Patent Pre-Grant Publ. No. 2008/0252367.

SUMMARY

An embodiment of the present invention, accordingly, provides an apparatus. The apparatus comprises a peak detector that is configured to detect a peak voltage; a first comparator that is coupled to the peak detector and that receives a first threshold voltage; a threshold generator that is coupled to the peak detector, wherein the threshold generator is configured to generate a second threshold voltage that is proportional to peak voltage; a delay circuit that is coupled to the first comparator; and a second comparator that is coupled to the delay circuit and that is coupled to the threshold generator so as to receive the second threshold voltage.

In accordance with an embodiment of the present invention, the peak detector further comprises a capacitor that is coupled to the first comparator; and a current source that is coupled to the first comparator in parallel to the capacitor.

In accordance with an embodiment of the present invention, the delay circuit further comprises a delay line.

In accordance with an embodiment of the present invention, the delay line further comprises a plurality of buffers coupled together in series with one another in a sequence, and wherein the capacitor and current source further comprise a first capacitor and a first current source, respectively, and wherein the delay circuit further comprises: an inverter having an input terminal, a first supply terminal, a second supply terminal, and an output terminal, wherein the input terminal of the inverter is coupled to the last buffer of the sequence, and wherein the output terminal of the inverter is coupled to the second comparator; a second current source that is coupled to the second supply terminal of the inverter; and a second capacitor that is coupled to the output terminal of the inverter.

In accordance with an embodiment of the present invention, the current-to-capacitance ratio of the first capacitor and the first current source is approximately equal to the current-to-capacitance ratio of the second capacitor and the second current source.

In accordance with an embodiment of the present invention, the threshold circuit further comprises: a resistor-capacitor (RC) circuit that is coupled to the second comparator; and a voltage-to-current (V2I) converter that is coupled between the peak detector and the second comparator.

In accordance with an embodiment of the present invention, the RC circuit further comprises: a resistor that is coupled to the second comparator; and a capacitor that is coupled to the second comparator in parallel to the resistor.

In accordance with an embodiment of the present invention, the V2I converter further comprises: an analog-to-digital converter (ADC) that is coupled to the peak detector; and a current digital-to-analog converter (DAC) that is coupled between the ADC and the second comparator.

In accordance with an embodiment of the present invention, the V2I converter further comprises: an amplifier that is coupled to the peak detector; and a current generator that is coupled to the amplifier and the second comparator.

In accordance with an embodiment of the present invention, the resistor further comprises a first resistor, and wherein the current generator further comprises: a first MOS transistor that is coupled to the amplifier at its gate; a second MOS transistor that is coupled to the amplifier at its gate; a second resistor that is coupled to the source of the first MOS transistor; and a current mirror that is coupled to the source of the second MOS transistor and the second comparator.

In accordance with an embodiment of the present invention, a method is provided. The method comprises detecting a peak voltage; generating a first threshold voltage that is proportional to the peak voltage; comparing the peak voltage to a second threshold to generate a comparison result; delaying the comparison result; and comparing the delayed comparison result to the first threshold voltage.

In accordance with an embodiment of the present invention, the step of generating the first threshold voltage further comprises: converting the peak voltage into a current; and converting the current into the first threshold voltage.

In accordance with an embodiment of the present invention, the step of converting the peak voltage into the current further comprises: converting the peak voltage into a digital signal; and generating the current from the digital signal.

In accordance with an embodiment of the present invention, an Amplitude Shift Keying (ASK) receiver is provided. The ASK receiver comprises a filter; a demodulator having: a peak detector that is coupled to the filter so as to detect a peak voltage, wherein the peak detector has a first capacitor and a first current source; a first comparator that is coupled to the peak detector and that receives a threshold voltage; a delay line that is coupled to the first comparator; an inverter having an input terminal, a first supply terminal, a second supply terminal, and an output terminal, wherein the input terminal of the inverter is coupled to the delay line; a second current source that is coupled to the second supply terminal of the inverter; a second capacitor that is coupled to the output terminal of the inverter; a second comparator that is coupled to the delay circuit; an RC circuit that is coupled to the second comparator; and a V2I converter that is coupled between the peak detector and the second comparator; and an ADC that is coupled to the demodulator.

In accordance with an embodiment of the present invention, the second ADC further comprises a flash ADC.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
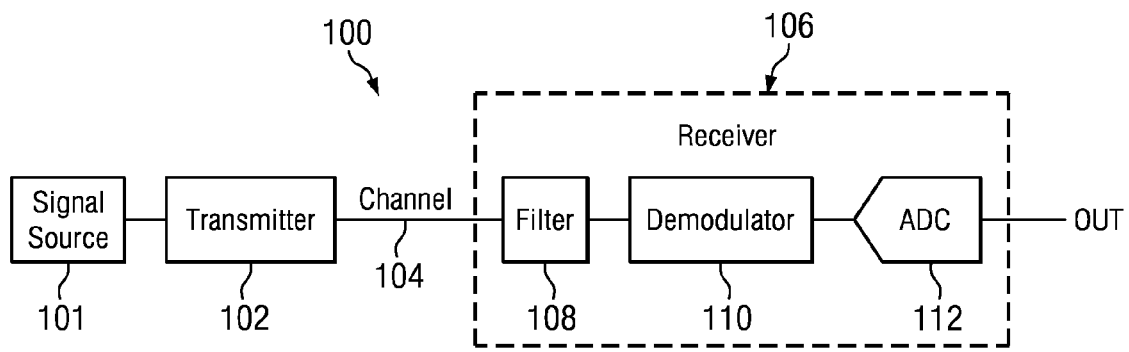
FIG. 1 is a diagram of an example of a system that employs ASK encoding.

Refer now to the drawings wherein depicted elements are, for the sake of clarity, not necessarily shown to scale and wherein like or similar elements are designated by the same reference numeral through the several views.

Figure 2:
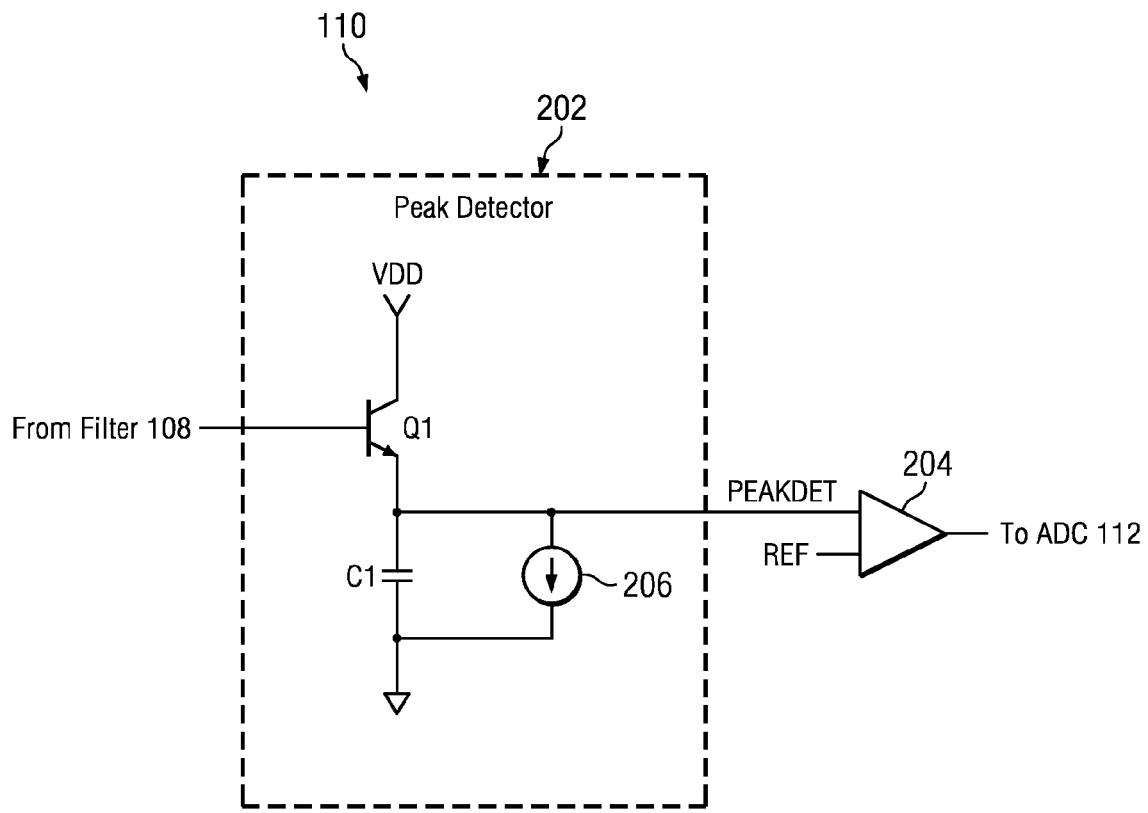
FIG. 2 is a diagram of an example of the demodulator of FIG. 1.
Figure 3:
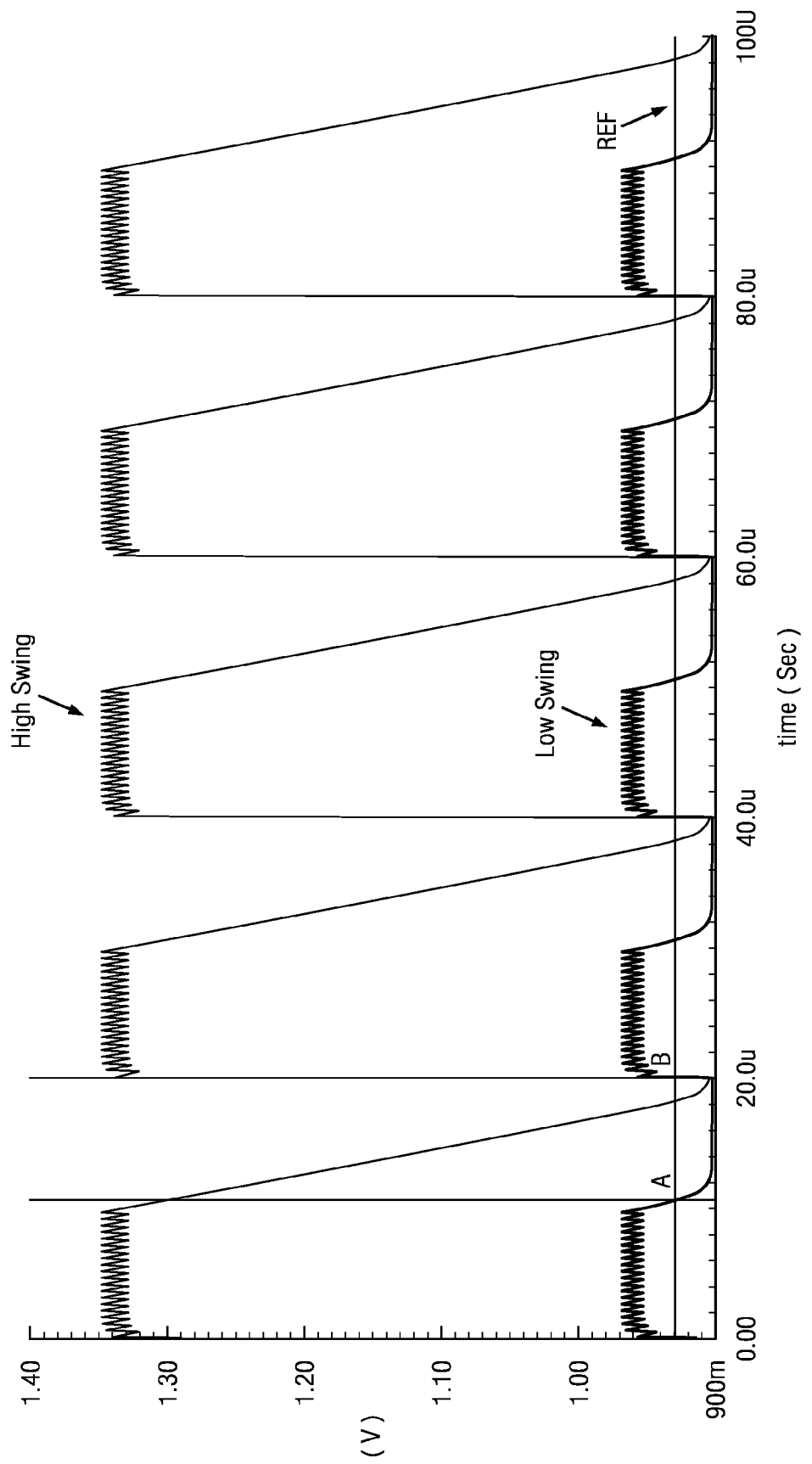
FIG. 3 is diagram depicting the operation of the demodulator or FIG. 2.
Figure 4:
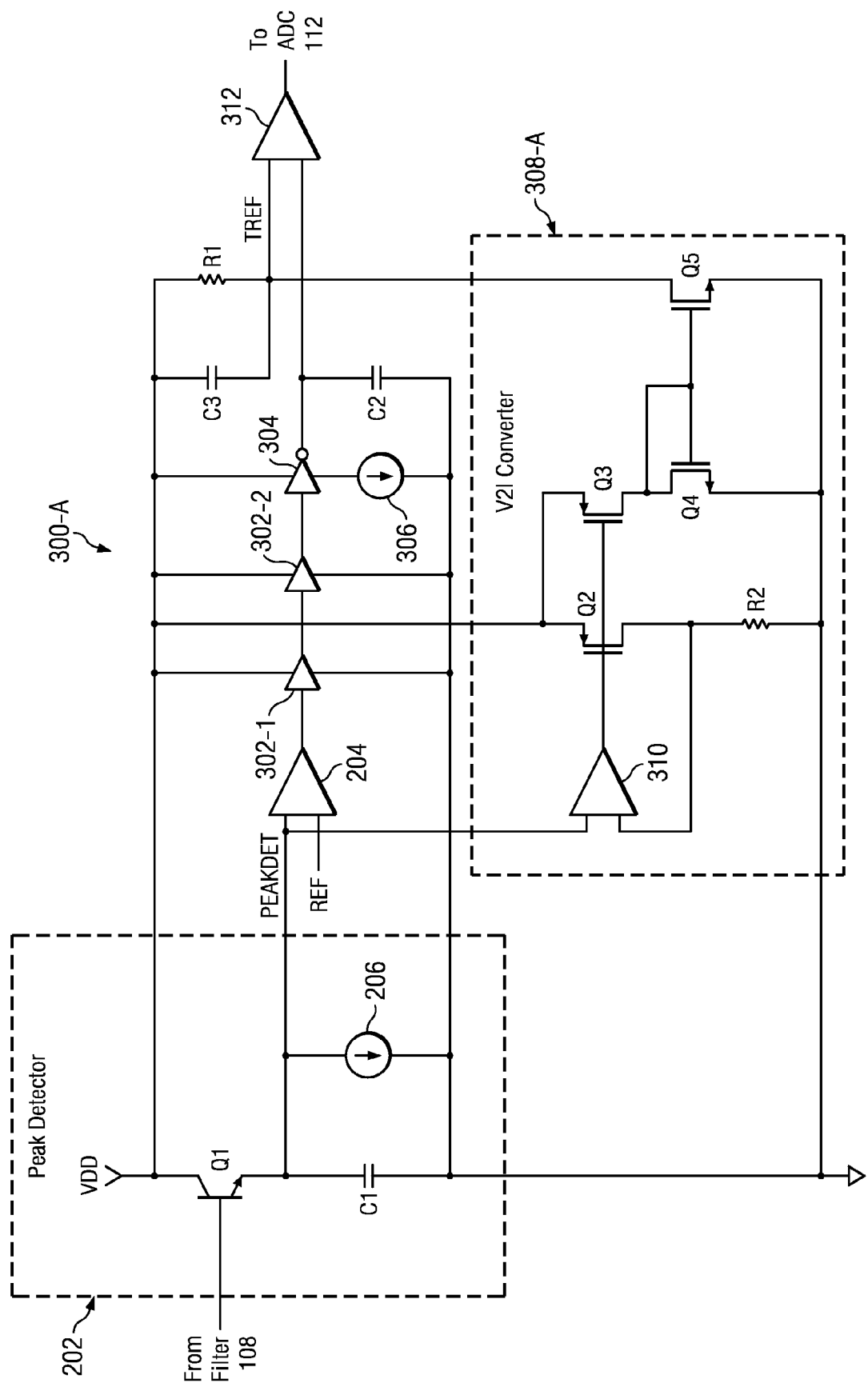
FIGS. 4 and 5 are diagrams of examples of demodulators in accordance with the present invention.
Figure 5:
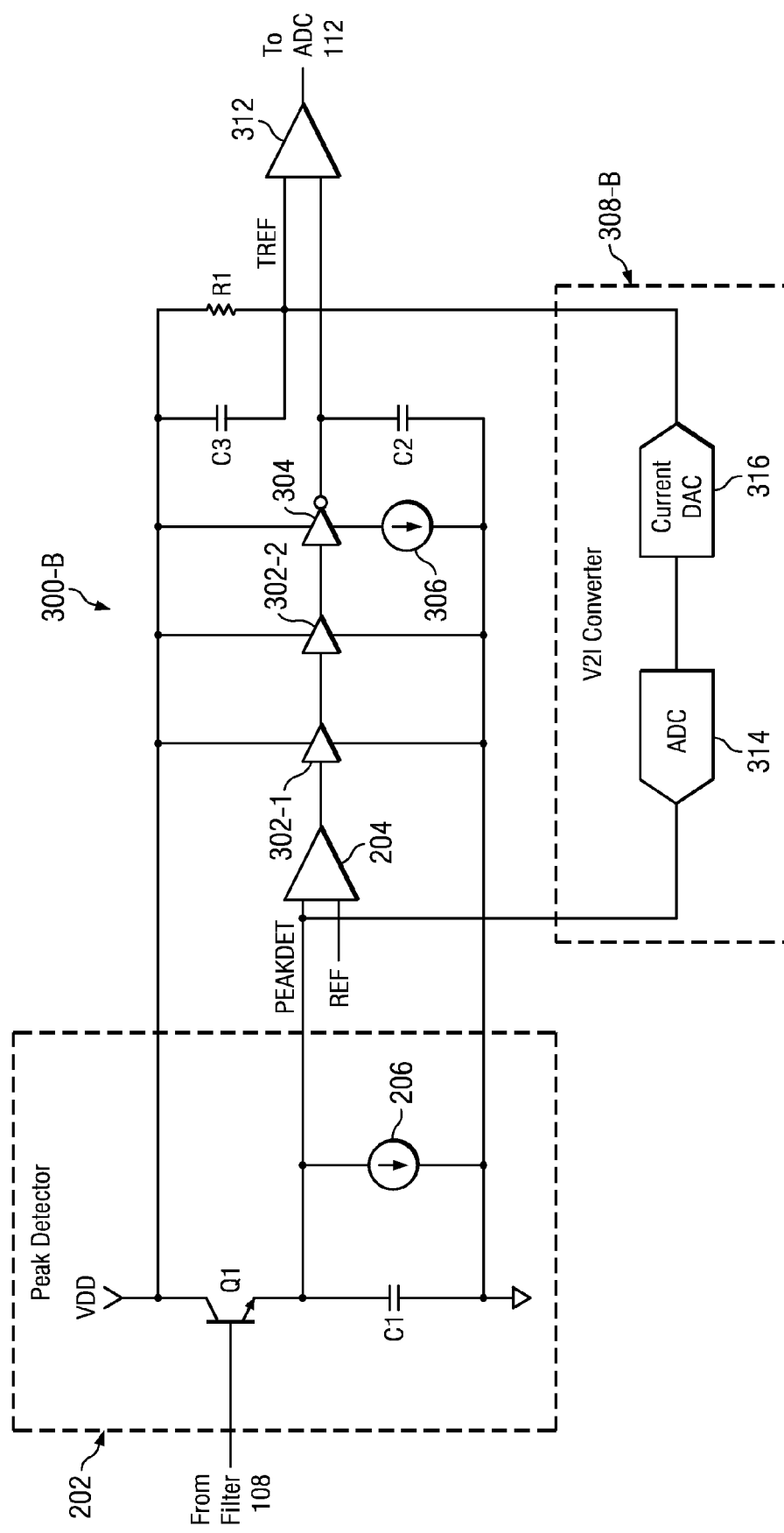

Turning to FIGS. 4 and 5, examples of demodulators 300 (labeled 300-A and 300-B for FIGS. 4 and 5, respectively) in accordance with the present invention can be seen. In both configurations, the demodulator 110 of FIG. 2 is employed with correction circuitry. Following the comparator 204, a delay circuit is used. This delay circuit generally comprises a delay line (i.e., buffers 302-1 and 302-1), an inverter 304, current source 306, and capacitor C2. As shown in FIG. 3 above, the duty cycle performance deteriorates at the falling edge, so the rising edge (which is the falling edge at the output of inverter 304) is intentionally delayed or slowed using current source 306 and capacitor C2 (which can, for example, have approximately the same current-to-capacitance ratio as current source 206 and capacitor C1). Additionally, threshold generator is able to generate a reference or threshold voltage TREF that is proportional to the peak voltage of peak detect signal PEAKDET. This can be accomplished by converting the this peak voltage into a current with voltage-to-current (V2I) converter 308 (labeled 308-A and 308-B for FIGS. 4 and 5, respectively) and passing this current through resistor R1 of resistor-capacitor (RC) circuit R1/C3. The threshold voltage TREF (which dynamically varies with the peak voltage) can then be used as the threshold for comparator 312 to generate the comparison result with the output from inverter 304. Other alternative configurations can be to allow voltage TREF to be generally fixed while varying the current sourced by current source 306 or 206 to be input signal dependent; this is normally accomplished by allowing the V2I converter to control the current source 306.

In implementing this scheme, the V2I converter 308 can be constructed in several ways, two examples of which are shown in FIGS. 4 and 5. Looking first to V2I converter 308-B of FIG. 5, an ADC 314 (which can, for example, be a flash ADC) is used to digitize the peak voltage of the peak detect signal PEAKDET, and a current digital-to-analog converter (DAC) is used to generate a current from the digital code generated by ADC 314. Alternatively, as shown in V2I converter 308-A of FIG. 4, transistors Q2 and Q4 (which can, for example, be PMOS transistors) are operated in their linear region by amplifier 310 and resistor R2 so as to generate a current that is proportional to the peak voltage. This current is then mirrored by current minor Q4/Q5 (which, for example, can be comprised of NMOS transistors) to generate voltage TREF. Additionally, the transistors Q2 to Q5 and resistor can be referred to as a current generator.

Figure 6:
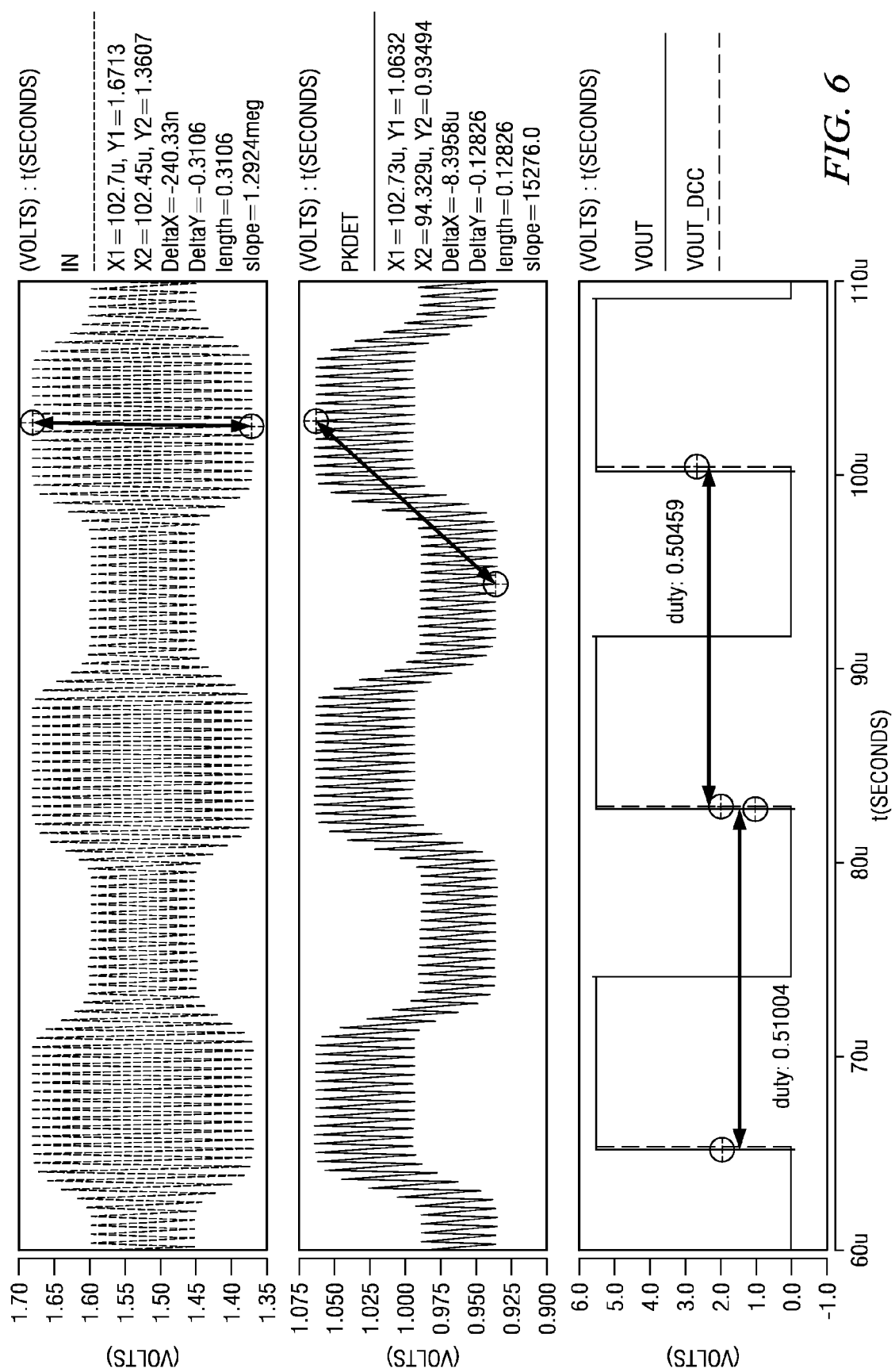
FIGS. 6 and 7 are diagrams depicting the operation of the demodulators of FIGS. 4 and 5.
Figure 7:
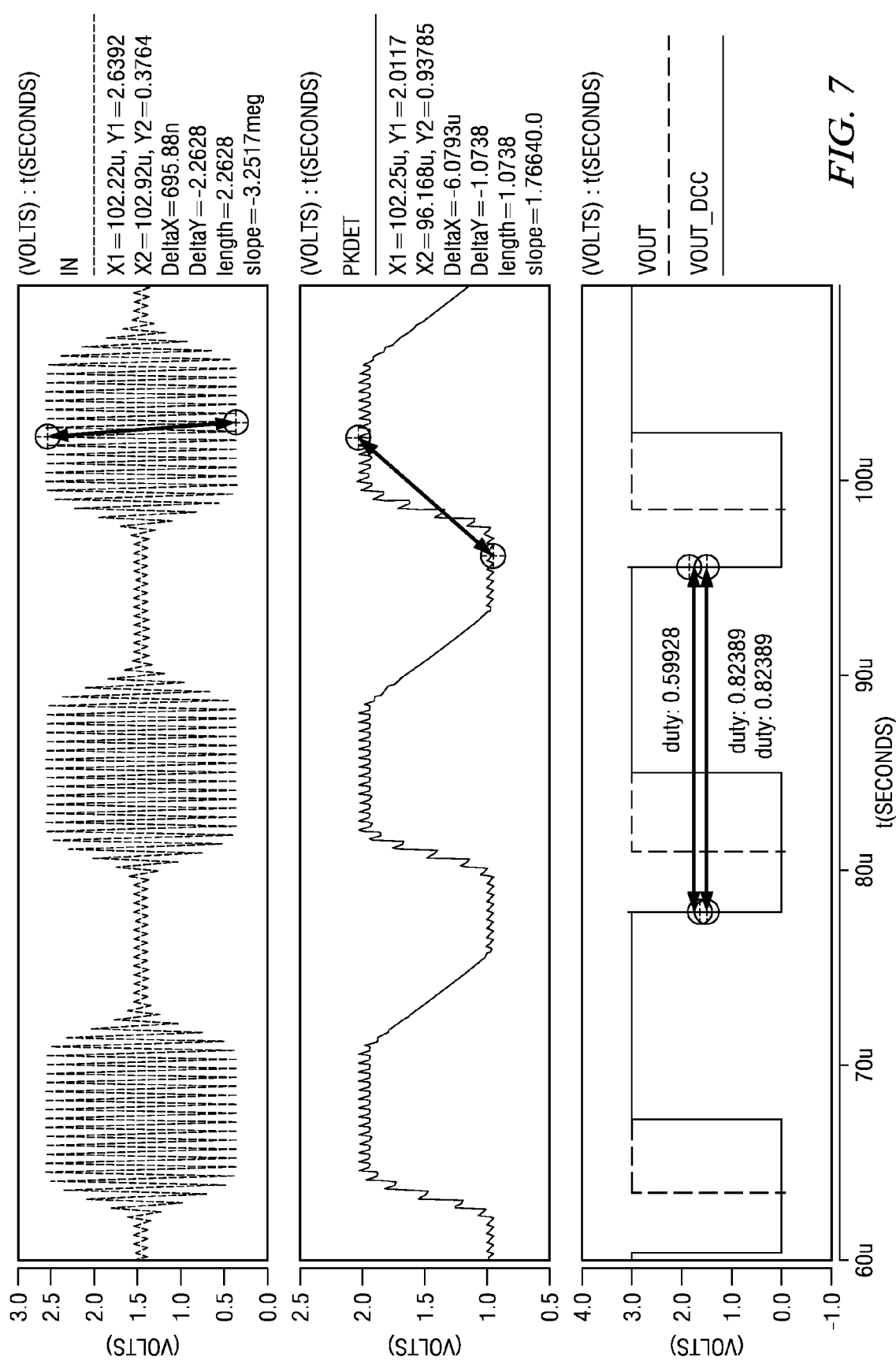

Turning to FIGS. 6 and 7, the performance of the demodulator 300 can be seen. An example simulation results for demodulator 300 are shown for low swing (i.e., $0.3V_{p-p}$) in FIG. 6. In this example, the peak detector 202 itself yields a 51% duty cycle, which is corrected to 50%. Additionally, for FIG. 7, example simulation results for a high swing (i.e., $2.2V_{p-p}$) is shown, and in this example, the peak detector 202 itself yields an 82% duty cycle, which is corrected to be less than 60%.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
a peak detector that is configured to detect a peak voltage;
a first comparator that is coupled to the peak detector and that receives a first threshold voltage;
a threshold generator that is coupled to the peak detector, wherein the threshold generator is configured to generate a second threshold voltage that is proportional to the peak voltage;
a delay circuit that is coupled to the first comparator; and
a second comparator that is coupled to the delay circuit and that is coupled to the threshold generator so as to receive the second threshold voltage;

wherein the peak detector further comprises:
   a capacitor that is coupled to the first comparator; and
   a current source that is coupled to the first comparator in parallel to the capacitor;
wherein the delay circuit further comprises a delay line; and
wherein the delay line further comprises a plurality of buffers coupled together in series with one another in a sequence, and wherein the capacitor and current source further comprise a first capacitor and a first current source, respectively, and wherein the delay circuit further comprises:
   an inverter having an input terminal, a first supply terminal, a second supply terminal, and an output terminal, wherein the input terminal of the inverter is coupled to the last buffer of the sequence, and wherein the output terminal of the inverter is coupled to the second comparator;
   a second current source that is coupled to the second supply terminal of the inverter; and
   a second capacitor that is coupled to the output terminal of the inverter.

2. The apparatus of claim 1, wherein the current-to-capacitance ratio of the first capacitor and the first current source is approximately equal to the current-to-capacitance ratio of the second capacitor and the second current source.

3. The apparatus of claim 1, wherein the threshold generator further comprises:
   a resistor-capacitor (RC) circuit that is coupled to the second comparator; and
   a voltage-to-current (V2I) converter that is coupled between the peak detector and the second comparator.

4. The apparatus of claim 3, wherein the RC circuit further comprises:
   a resistor that is coupled to the second comparator; and
   a capacitor that is coupled to the second comparator in parallel to the resistor.

5. The apparatus of claim 4, wherein the V2I converter further comprises:
   an analog-to-digital converter (ADC) that is coupled to the peak detector; and
   a current digital-to-analog converter (DAC) that is coupled between the ADC and the second comparator.

6. The apparatus of claim 4, wherein the V2I converter further comprises:
   an amplifier that is coupled to the peak detector; and
   a current generator that is coupled to the amplifier and the second comparator.

7. The apparatus of claim 6, wherein the resistor further comprises a first resistor, and wherein the current generator further comprises:
   a first MOS transistor that is coupled to the amplifier at its gate;
   a second MOS transistor that is coupled to the amplifier at its gate;
   a second resistor that is coupled to the source of the first MOS transistor; and
   a current mirror that is coupled to the source of the second MOS transistor and the second comparator.

8. A method comprising:
   detecting a peak voltage;
   generating a first threshold voltage that is proportional to the peak voltage;
   comparing the peak voltage to a second threshold to generate a comparison result;
   delaying the comparison result; and
   comparing the delayed comparison result to the first threshold voltage.

9. The method of claim 8, wherein the step of generating the first threshold voltage further comprises:
   converting the peak voltage into a current; and
   converting the current into the first threshold voltage.

10. The method of claim 9, wherein the step of converting the peak voltage into the current further comprises:
    converting the peak voltage into a digital signal; and
    generating the current from the digital signal.

11. An Amplitude Shift Keying (ASK) receiver comprising:
    a filter;
    a demodulator having:
       a peak detector that is coupled to the filter so as to detect a peak voltage, wherein the peak detector has a first capacitor and a first current source;
       a first comparator that is coupled to the peak detector and that receives a threshold voltage;
       a delay line that is coupled to the first comparator;
       an inverter having an input terminal, a first supply terminal, a second supply terminal, and an output terminal, wherein the input terminal of the inverter is coupled to the delay line;
       a second current source that is coupled to the second supply terminal of the inverter;
       a second capacitor that is coupled to the output terminal of the inverter;
       a second comparator that is coupled to the delay circuit;
       a resistor-capacitor (RC) circuit that is coupled to the second comparator; and
       a voltage-to-current (V2I) converter that is coupled between the peak detector and the second comparator; and
    an ADC that is coupled to the demodulator.

12. The ASK receiver of claim 11, wherein the current-to-capacitance ratio of the first capacitor and the first current source is approximately equal to the current-to-capacitance ratio of the second capacitor and the second current source.

13. The ASK receiver of claim 12, wherein the RC circuit further comprises:
    a resistor that is coupled to the second comparator; and
    a third capacitor that is coupled to the second comparator in parallel to the resistor.

14. The ASK receiver of claim 13, wherein the ADC further comprises a first ADC, and wherein the V2I converter further comprises:
    a second ADC that is coupled to the peak detector; and
    a current DAC that is coupled between the second ADC and the second comparator.

15. The ASK receiver of claim 14, wherein the second ADC further comprises a flash ADC.

16. The ASK receiver of claim 13, wherein the V2I converter further comprises:
    an amplifier that is coupled to the peak detector; and
    a current generator that is coupled to the amplifier and the second comparator.

17. The ASK receiver of claim 15, wherein the resistor further comprises a first resistor, and wherein the current generator further comprises:
    a first PMOS transistor that is coupled to the amplifier at its gate;
    a second PMOS transistor that is coupled to the amplifier at its gate;
    a second resistor that is coupled to the source of the first PMOS transistor; and a current mirror that is coupled to the source of the second PMOS transistor and the second comparator.

\* \* \* \* \*